(12) United States Patent
Arvo

(10) Patent No.: US 9,330,475 B2
(45) Date of Patent: May 3, 2016

(54) COLOR BUFFER AND DEPTH BUFFER COMPRESSION

(71) Applicant: QUALCOMM Incorporated, San Diego, CA (US)

(72) Inventor: Jukka-Pekka Arvo, Raisio (FI)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 13/873,897

(22) Filed: Apr. 30, 2013

(65) Prior Publication Data

US 2013/0293565 A1  Nov. 7, 2013

Related U.S. Application Data

(60) Provisional application No. 61/641,257, filed on May 1, 2012.

(51) Int. Cl.

| | | |
|---|---|---|
| G09G 5/02 | (2006.01) | |
| G06T 9/00 | (2006.01) | |
| H04N 1/64 | (2006.01) | |
| H04N 19/176 | (2014.01) | |
| H04N 19/593 | (2014.01) | |
| H04N 19/103 | (2014.01) | |
| H04N 19/14 | (2014.01) | |
| H04N 19/186 | (2014.01) | |
| H04N 19/423 | (2014.01) | |

(52) U.S. Cl.
CPC .. *G06T 9/00* (2013.01); *H04N 1/64* (2013.01); *H04N 19/103* (2014.11); *H04N 19/14* (2014.11); *H04N 19/176* (2014.11); *H04N 19/186* (2014.11); *H04N 19/423* (2014.11); *H04N 19/593* (2014.11)

(58) Field of Classification Search
CPC ........................................................ G06T 9/00
USPC .................................................. 345/589, 619
See application file for complete search history.

(56) References Cited

U.S. PATENT DOCUMENTS

| | | |
|---|---|---|
| 6,614,449 B1 | 9/2003 | Morein |
| 6,825,847 B1 | 11/2004 | Molnar et al. |
| 6,999,100 B1 * | 2/2006 | Leather et al. ................ 345/611 |
| 7,612,783 B2 | 11/2009 | Koduri et al. |
| 7,920,148 B2 | 4/2011 | Zhong et al. |
| 2004/0161146 A1 | 8/2004 | Van et al. |
| 2005/0057564 A1 | 3/2005 | Liao et al. |
| 2006/0103658 A1 | 5/2006 | Liao |

(Continued)

OTHER PUBLICATIONS

Wikipedia, Multisample anti-aliasing, Sep. 1, 2010, http://en.wikipedia.org/w/index.php?title=Multisample_anti-aliasing&oldid=382179557, pp. 1-4.*

Beaudoin et al, Compressed Multisampling for Efficient Hardware Edge Antialiasing, May 17-19, 2004, GI '04 Proceedings of Graphics Interface, pp. 169-176.*

International Preliminary Report on Patentability—PCT/US2013/039056, The International Bureau of WIPO—Geneva, Switzerland, Jul. 29, 2014, 7 pp.

(Continued)

*Primary Examiner* — Xiao Wu
*Assistant Examiner* — Mohammad H Akhavannik
(74) *Attorney, Agent, or Firm* — Shumaker & Sieffert, P.A.

(57) ABSTRACT

In an example, a method of coding graphics data comprising a plurality of pixels includes performing, by a graphics processing unit (GPU), multi-sample anti-aliasing to generate one or more sample values for each pixel of the plurality of pixels. The method may also include determining whether pixels comprise edge pixels, where the determination comprises identifying, for each pixel, differing sample values. The method may also include encoding the pixels based on the edge pixel determination.

33 Claims, 7 Drawing Sheets

(56) References Cited

U.S. PATENT DOCUMENTS

| | | |
|---|---|---|
| 2006/0170703 A1 | 8/2006 | Liao |
| 2006/0188163 A1* | 8/2006 | Elder .......................... 382/232 |
| 2006/0250407 A1 | 11/2006 | Xu |
| 2007/0257935 A1 | 11/2007 | Koduri et al. |
| 2009/0027416 A1* | 1/2009 | Barone et al. ................ 345/611 |
| 2009/0256848 A1 | 10/2009 | Iourcha et al. |
| 2010/0086063 A1* | 4/2010 | Haskell et al. ........... 375/240.27 |
| 2012/0050303 A1* | 3/2012 | McAllister et al. ........... 345/589 |
| 2012/0121198 A1* | 5/2012 | Liao et al. .................... 382/238 |
| 2013/0249927 A1* | 9/2013 | Brennan ...................... 345/589 |

OTHER PUBLICATIONS

International Search Report and Written Opinion—PCT/US2013/039056—ISA/EPO—Aug. 21, 2013, 10 pp.

Second Written Opinion from International Application No. PCT/US2013/039056, dated Apr. 7, 2014, 6 pp.

Response to Written Opinion dated Aug. 21, 2013, from International Application No. PCT/US2013/039056, filed on Feb. 28, 2014, 26 pp.

Response to Second Written Opinion dated Apr. 7, 2014, from International Application No. PCT/US2013/039056, filed on Jun. 5, 2014, 21 pp.

* cited by examiner

COLOR BUFFER AND DEPTH BUFFER COMPRESSION

This application claims the benefit of U.S. Provisional Application No. 61/641,257, filed 1 May 2012, the entire contents of which is hereby incorporated by reference.

TECHNICAL FIELD

This disclosure relates to rendering computer graphics.

BACKGROUND

A device that provides content for visual presentation generally includes a graphics processing unit (GPU). The GPU renders pixels that are representative of the content on a display. The GPU generates one or more pixel values for each pixel on the display and performs graphics processing on the pixel values for each pixel on the display to render each pixel for presentation.

SUMMARY

Aspects of this disclosure generally relate to compressing graphics data, which may be referred to as coding graphics data. For example, a pixel of graphics data may be composed of one or more samples (e.g., one or more color samples, one or more depth samples, and the like), with each sample contributing to the pixel value. Aspects of this disclosure generally relate to compressing the sample values associated with a pixel to reduce the amount of data that is needed to represent pixel values. Aspects of this disclosure may also relate to identifying pixels located at the edges of objects, which may have differing sample values. In some examples, sample deltas may be generated relative to a base value when compressing the samples associated with edge pixels.

In an example, a method of encoding graphics data comprising a plurality of pixels includes determining, by a graphics processing unit (GPU), one or more sample values for each pixel of the plurality of pixels, determining whether each pixel comprises an edge pixel, wherein the determination comprises identifying, for each pixel, differing sample values of the one or more sample values for the respective pixel, and encoding the pixels based on the edge pixel determination.

In another example, an apparatus for encoding graphics data comprising a plurality of pixels includes one or more processors configured to determine one or more sample values for each pixel of the plurality of pixels, determine whether each pixel comprises an edge pixel, wherein the determination comprises identifying, for each pixel, differing sample values of the one or more sample values for the respective pixel, and encode the pixels based on the edge pixel determination.

In another example, an apparatus for encoding graphics data comprising a plurality of pixels includes means for determining one or more sample values for each pixel of the plurality of pixels, means for determining whether each pixel comprises an edge pixel, wherein the determination comprises identifying, for each pixel, differing sample values of the one or more sample values for the respective pixel, and means for encoding the pixels based on the edge pixel determination.

In another example, a non-transitory computer-readable medium having instructions stored thereon that, when executed, cause one or more processors to determine one or more sample values for each pixel of the plurality of pixels, determine whether each pixel comprises an edge pixel, wherein the determination comprises identifying, for each pixel, differing sample values of the one or more sample values for the respective pixel, and encode the pixels based on the edge pixel determination.

The details of one or more examples of the disclosure are set forth in the accompanying drawings and the description below. Other features, objects, and advantages will be apparent from the description and drawings, and from the claims.

DETAILED DESCRIPTION

Figure 1:
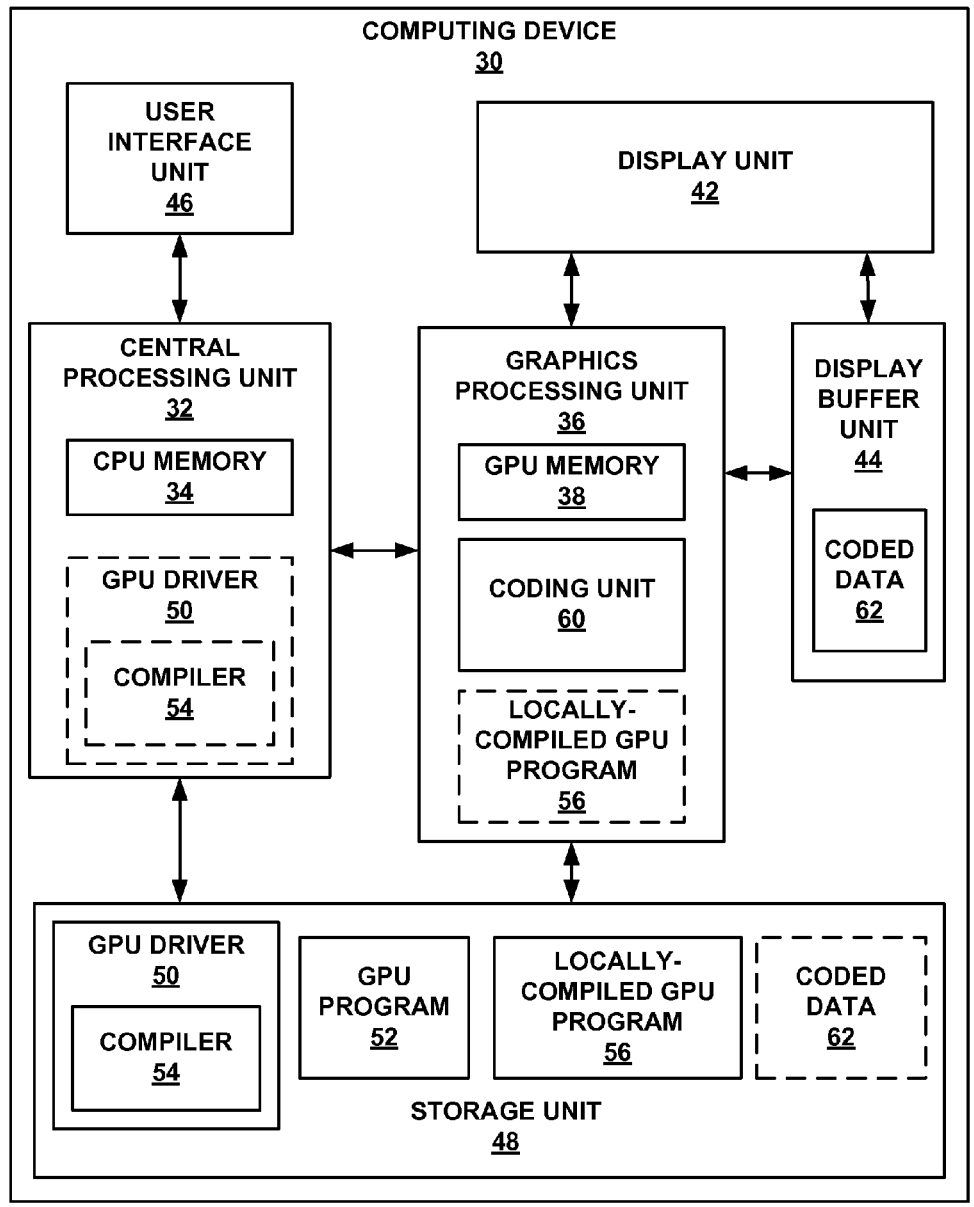
FIG. 1 is a block diagram illustrating a computing device that may be configured to implement aspects of this disclosure.

FIG. 1 is a block diagram illustrating a computing device 30 that may implement the techniques of this disclosure for coding graphics data. Examples of computing device 30 include, but are not limited to, wireless devices, mobile or cellular telephones, including so-called smartphones, personal digital assistants (PDAs), video gaming consoles that include video displays, mobile video gaming devices, mobile video conferencing units, laptop computers, desktop computers, television set-top boxes, tablet computing devices, e-book readers, fixed or mobile media players, and the like.

In the example of FIG. 1, computing device 30 includes a central processing unit (CPU) 32 having CPU memory 34, a graphics processing unit (GPU) 36 having GPU memory 38 and coding unit 60, a display unit 42, a display buffer unit 44, a user interface unit 46, and a storage unit 48. In addition, storage unit 48 may store GPU driver 50 having compiler 54, GPU program 52, and locally-compiled GPU program 56.

Examples of CPU 32 include, but are not limited to, a digital signal processor (DSP), general purpose microprocessor, application specific integrated circuit (ASIC), field programmable logic array (FPGA), or other equivalent integrated or discrete logic circuitry. Although CPU 32 and GPU 36 are illustrated as separate units in the example of FIG. 1, in some examples, CPU 32 and GPU 36 may be integrated into a single unit. CPU 32 may execute one or more applications. Examples of the applications may include web browsers, e-mail applications, spreadsheets, video games, audio and/or video capture, playback or editing applications, or other applications that initiate the generation for image data to be presented via display unit 42.

In the example shown in FIG. 1, CPU 32 includes CPU memory 34. CPU memory 34 may represent on-chip storage or memory used in executing machine or object code. CPU memory 34 may each comprise a hardware memory register capable of storing a fixed number of digital bits. CPU 32 may be able to read values from or write values to local CPU memory 34 more quickly than reading values from or writing values to storage unit 48, which may be system memory that is accessed, e.g., over a system bus.

GPU 36 represents one or more dedicated processors for performing graphical operations. That is, for example, GPU 36 may be a dedicated hardware unit having fixed function and programmable components for rendering graphics and executing GPU applications. GPU 36 may also include a DSP, a general purpose microprocessor, an ASIC, an FPGA, or other equivalent integrated or discrete logic circuitry.

GPU 36 also includes GPU memory 38, which may represent on-chip storage or memory used in executing machine or object code. GPU memory 38 may comprise one or more hardware memory registers capable of storing a fixed number of digital bits. GPU 36 may be able to read values from or write values to local GPU memory 38 more quickly than reading values from or writing values to storage unit 48, which may be accessed, e.g., over a system bus.

Display unit 42 represents a unit capable of displaying video data, images, text or any other type of data for consumption by a viewer. Display unit 42 may include a liquid-crystal display (LCD), a light emitting diode (LED) display, an organic LED (OLED), an active-matrix OLED (AMOLED) display, or the like.

Display buffer unit 44 represents a memory or storage device dedicated to storing data for presentation of imagery, such as photos or video frames, for display unit 42. Display buffer unit 44 may represent a two-dimensional buffer that includes a plurality of storage locations. The number of storage locations within display buffer unit 44 may be substantially similar to the number of pixels to be displayed on display unit 42. For example, if display unit 42 is configured to include 640×480 pixels, display buffer unit 44 may include 640×480 storage locations. Display buffer unit 44 may store the final pixel values for each of the pixels processed by GPU 36. Display unit 42 may retrieve the final pixel values from display buffer unit 44, and display the final image based on the pixel values stored in display buffer unit 44.

User interface unit 46 represents a unit with which a user may interact or otherwise interface to communicate with other units of computing device 30, such as CPU 32. Examples of user interface unit 46 include, but are not limited to, a trackball, a mouse, a keyboard, and other types of input devices. User interface unit 46 may also be a touch screen and may be incorporated as a part of display unit 42.

Storage unit 48 may comprise one or more computer-readable storage media. Examples of storage unit 48 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be accessed by a computer or a processor.

In some example implementations, storage unit 48 may include instructions that cause CPU 32 and/or GPU 36 to perform the functions ascribed to CPU 32 and GPU 36 in this disclosure. Storage unit 48 may, in some examples, be considered as a non-transitory storage medium. The term "non-transitory" may indicate that the storage medium is not embodied in a carrier wave or a propagated signal. However, the term "non-transitory" should not be interpreted to mean that storage unit 48 is non-movable. As one example, storage unit 48 may be removed from computing device 30, and moved to another device. As another example, a storage unit, substantially similar to storage unit 48, may be inserted into computing device 30. In certain examples, a non-transitory storage medium may store data that can, over time, change (e.g., in RAM).

Storage unit 48 stores a GPU driver 50 and compiler 54, GPU program 52, and locally-compiled GPU program 56. GPU driver 50 represents a computer program or executable code that provides an interface to access GPU 36. CPU 32 executes GPU driver 50 or portions thereof to interface with GPU 36 and, for this reason, GPU driver 50 is shown in the example of FIG. 1 as a dash-lined box labeled "GPU driver 50" within CPU 32. GPU driver 50 is accessible to programs or other executables executed by CPU 32, including GPU program 52.

GPU program 52 may include code written in a high level (HL) programming language, e.g., using an application programming interface (API). Examples of APIs include Open-Computing Language ("OpenCL"), Open Graphics Library ("OpenGL"), and DirectX, as developed by Microsoft, Inc. In general, an API includes a predetermined, standardized set of commands that are executed by associated hardware. API commands allow a user to instruct hardware components of a GPU to execute commands without user knowledge as to the specifics of the hardware components.

GPU program 52 may invoke or otherwise include one or more functions provided by GPU driver 50. CPU 32 generally executes the program in which GPU program 52 is embedded and, upon encountering GPU program 52, passes GPU program 52 to GPU driver 50 (e.g., in the form of a command stream). CPU 32 executes GPU driver 50 in this context to process GPU program 52. That is, for example, GPU driver 50 may process GPU program 52 by compiling GPU program 52 into object or machine code executable by GPU 36. This object code is shown in the example of FIG. 1 as locally compiled GPU program 56.

In some examples, compiler 54 may operate in real-time or near-real-time to compile GPU program 52 during the execution of the program in which GPU program 52 is embedded. For example, compiler 54 generally represents a module that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, e.g., CPU 32 and GPU 36).

LL programming languages are considered low level in the sense that they provide little abstraction, or a lower level of abstraction, from an instruction set architecture of a processor or the other types of hardware. LL languages generally refer to assembly and/or machine languages. Assembly languages are a slightly higher LL language than machine languages but generally assembly languages can be converted into machine languages without the use of a compiler or other translation module. Machine languages represent any language that defines instructions that are similar, if not the same as, those natively executed by the underlying hardware, e.g., a processor, such as the x86 machine code (where the x86 refers to an instruction set architecture of an x86 processor developed by Intel Corporation), as one example.

In any case, compiler 54 may translate HL instructions defined in accordance with a HL programming language into LL instructions supported by the underlying hardware. Compiler 54 removes the abstraction associated with HL programming languages (and APIs) such that the software defined in accordance with these HL programming languages is capable of being more directly executed by the actual underlying hardware.

In the example of FIG. 1, compiler 54 may receive GPU program 52 from CPU 32 when executing HL code that includes GPU program 52. Compiler 54 may compile GPU program 52 to generate locally-compiled GPU program 56 that conforms to a LL programming language. Compiler 54 then outputs locally-compiled GPU program 56 that includes the LL instructions.

GPU 36 generally receives locally-compiled GPU program 56 (as shown by the dashed lined box labeled "locally-compiled GPU program 56" within GPU 36), whereupon, in some instances, GPU 36 renders an image and outputs the rendered portions of the image to display buffer unit 44. For example, GPU 36 may generate a number of primitives to be displayed at display unit 42. Primitives may include one or more of a line (including curves, splines, etc.), a point, a circle, an ellipse, a polygon (where typically a polygon is defined as a collection of one or more triangles) or any other two-dimensional (2D) primitive. The term "primitive" may also refer to three-dimensional (3D) primitives, such as cubes, cylinders, sphere, cone, pyramid, torus, or the like. Generally, the term "primitive" refers to any basic geometric shape or element capable of being rendered by GPU 36 for display as an image (or frame in the context of video data) via display unit 42.

GPU 36 may transform primitives and other state data (e.g., that defines a color, texture, lighting, camera configuration, or other aspect) of the primitives into a so-called "world space" by applying one or more model transforms (which may also be specified in the state data). Once transformed, GPU 36 may apply a view transform for the active camera (which again may also be specified in the state data defining the camera) to transform the coordinates of the primitives and lights into the camera or eye space. GPU 36 may also perform vertex shading to render the appearance of the primitives in view of any active lights. GPU 36 may perform vertex shading in one or more of the above model, world or view space (although it is commonly performed in the world space).

Once the primitives are shaded, GPU 36 may perform projections to project the image into a unit cube with extreme points, as one example, at (−1, −1, −1) and (1, 1, 1). This unit cube is commonly referred to as a canonical view volume. After transforming the model from the eye space to the canonical view volume, GPU 36 may perform clipping to remove any primitives that do not at least partially reside within the view volume. In other words, GPU 36 may remove any primitives that are not within the frame of the camera. GPU 36 may then map the coordinates of the primitives from the view volume to the screen space, effectively reducing the 3D coordinates of the primitives to the 2D coordinates of the screen.

Given the transformed and projected vertices defining the primitives with their associated shading data, GPU 36 may then rasterize the primitives. For example, GPU 36 may compute and set colors for the pixels of the screen covered by the primitives. During rasterization, GPU 36 may apply any textures associated with the primitives (where textures may comprise state data). GPU 36 may also perform a Z-buffer algorithm, also referred to as a depth test, during rasterization to determine whether any of the primitives and/or objects are occluded by any other objects. The Z-buffer algorithm sorts primitives according to their depth so that GPU 36 knows the order in which to draw each primitive to the screen. GPU 36 outputs rendered pixels to display buffer unit 44.

In some examples, aliasing occurs because real-world objects have continuous, smooth curves and lines, while a typical display may be configured to output discrete points of light, i.e., pixels. Pixels are uniformly colored and always of the same shape, which may result in lines of a rendered image becoming jagged in appearance. With multi-sample anti-aliasing (MSAA), multiple samples may be generated for a single pixel. The samples may then be combined (e.g., averaged) to determine a final pixel value.

Accordingly, GPU 36 may render an image at a higher resolution than the resolution being displayed. GPU 36 may then down-sample the image to the appropriate size prior to display. The result may be smoother transitions from one line of pixels to another along the edges of objects. MSAA may be performed using a factor of 4, 8, 16, or other values.

As described herein, a "pixel" may refer to a single fragment that is visible in an image. A "sample" may refer to a single value that contributes to a pixel. For example, a sample may include a color value (e.g., a single RGBA value) that contributes to one pixel in the final image. In four sample MSAA mode, four Red, Green, Blue, Alpha (RGBA) samples may contribute to each pixel. In other examples, a sample may include a depth value (e.g., a z-value). In addition, an "edge" may refer to one or more points (e.g., one or more pixels) of an image having brightness, color, or depth discontinuities between sample values contributing to the points. For example, in a four sample MSAA mode, if all four samples are not equal, the corresponding pixel may be classified as an edge pixel.

A "block" may refer to an N×N group of pixels. A "block cache" may refer to GPU memory (e.g., on chip storage) that stores a set of uncompressed blocks. Block encoding may be computed when a block is written to system memory from the cache. Block decoding may be computed when a compressed block is read in to the cache from system memory. In some examples, Red Blue (RB) (or Red Green Blue (RGB) color writes may go to, and RB color reads (or RGB) may come from, the block cache.

If a pixel is covered by a single primitive, all samples (e.g., MSAA samples) inside the pixel may share the same color and/or depth information. Accordingly, there may be 4× duplicate information at the sample level. It is also possible that four samples from multiple primitives share the same color and/or depth data. For example, pixels may have similar colors and/or depths inside a relatively small block (e.g., a 4×4 block of pixels). Aspects of this disclosure relate to compressing such color and depth data.

Display buffer unit 44 may temporarily store the rendered pixels of the rendered image until the entire image is rendered. Display buffer unit 44 may be considered as an image frame buffer in this context. Display buffer unit 44 may then transmit the rendered image to be displayed on display unit 42. Display buffer unit 44 may include storage for a variety of data, including color data (e.g., Red, Green, Blue, Alpha (RGBA) or data in any other color space) and depth data (e.g., z-values indicative of pixel depth relative to pixels of other primitives).

In any event, as noted above, GPU 36 may read data from and write data to memory external to GPU 36 (e.g., display buffer unit 44 and/or storage unit 48, referred to generally as "system memory") when rendering pixel data. The amount of data that needs to be transferred between system memory and GPU 36 during rendering of a single image may be significant and may limit rendering performance. For example, with respect to mode rendering (immediate mode and/or retained mode rendering), GPU 36 may render a single pixel of a final image multiple times. The bandwidth between local GPU memory 38 and system memory may be further strained when GPU 36 uses MSAA techniques due to the additional samples associated with MSAA. Accordingly, when draw calls are used to directly render pixels to system memory, sufficient memory bandwidth may not be available to transfer color and depth data between system memory and local GPU memory 38.

In addition, typical video and/or image compression algorithms may not be optimized to perform compression of 3D color buffer rendering, as the memory access patterns may be random, unit access sizes may be small, and the compression for graphics rendering may need to be lossless. Further, typical video and/or image compression techniques may not be applicable to computer generated graphics, as the concept of MSAA is not generally applicable in the video/image domain.

Aspects of this disclosure generally relate to compressing graphics data, which may reduce the amount of data that needs to be transferred between GPU memory 38 and system memory (i.e., display unit buffer 44 and/or storage unit 48). For example, according to aspects of this disclosure, GPU 36 may compress sample values associated with a pixel to reduce the amount of data that is needed to represent pixel values.

In the example shown in FIG. 1, coding unit 60 may be responsible for coding graphics data. For example, coding unit 60 may encode rendered graphics data when writing the graphics data to display unit buffer 44 and/or storage unit 48 as coded data 62. Likewise, coding unit 60 may decode the coded data 62 when reading coded data 62 from display unit buffer 44 and/or storage unit 48. While coding unit 60 is shown in the example of FIG. 1 as being included in GPU 36, in other examples, coding unit 60 may be incorporated in any other component of computing device 30.

In some examples, coding unit 60 may code (compress) edge pixels differently than non-edge pixels. For example, as noted above, samples for non-edge pixels may share the same color, depth, and/or other samples. Accordingly, GPU 36 may represent all samples with the same, single sample value. However, as noted above, edge pixels do not have equal sample values. Selecting a representative sample value for all of the samples may result in lossy compression.

According to aspects of this disclosure, coding unit 60 may code non-edge pixels by combining all of the sample values for a pixel. For example, a non-edge pixel sampled using a four sample MSAA scheme may have four equal color samples. Accordingly, coding unit 60 may combine the samples into a single sample value.

Figure 2:
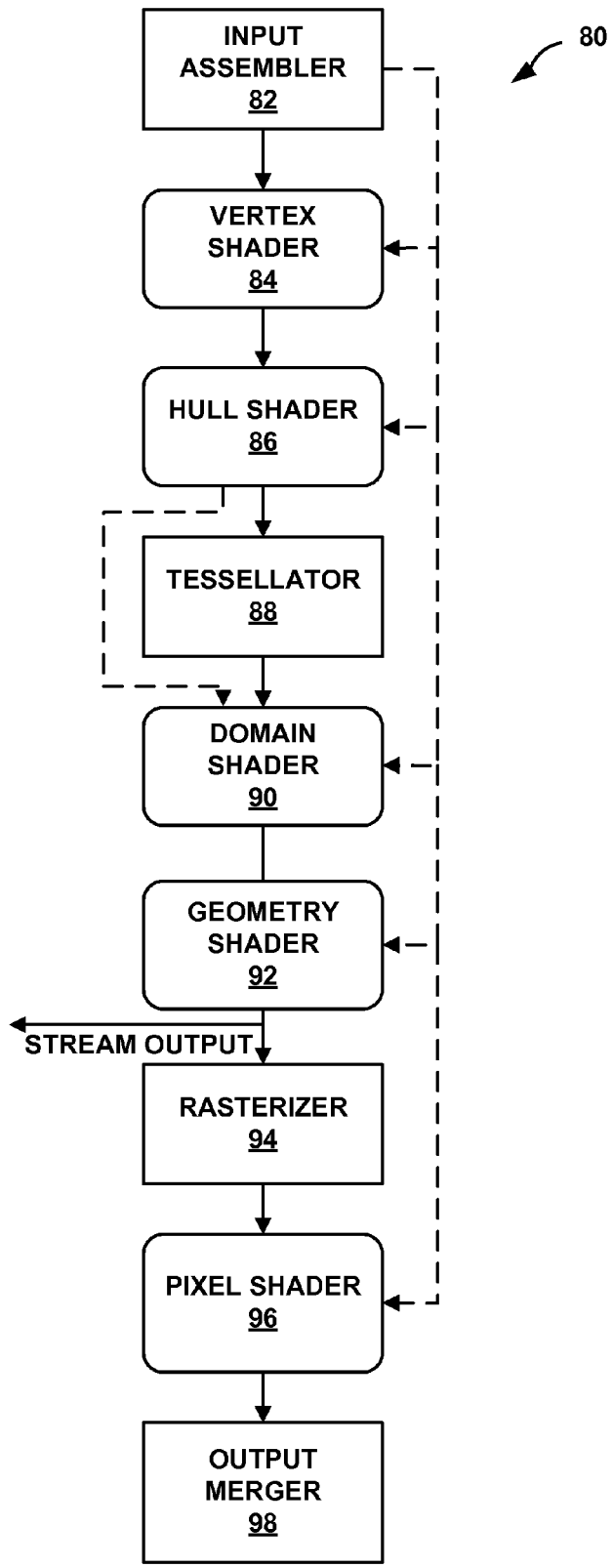
FIG. 2 is a conceptual diagram illustrating a graphics processing pipeline.

Coding unit 60 may detect an edge pixel by identifying samples associated with a pixel that have differing values (e.g., at least one color, brightness, and/or depth value that is not equal to the other samples associated with the other samples of the pixel). Coding unit 60 may detect an edge pixel from a rasterizer or render backend (as shown in FIG. 2 below). After detecting an edge pixel, coding unit 60 may determine a base value for the edge pixel and may only store bits for the samples that are different than the base value, which may be referred to as bit-plane based compression. In this way, coding unit 60 may retain all of the information for the samples, while still compressing the amount of data required to represent the pixel.

Assume, for purposes of explanation, that coding unit 60 is configured to code 4×4 blocks of pixels when writing such blocks from GPU memory 38 to display unit buffer 44 and/or storage unit 38. Assume also that each pixel is sampled using a four sample MSAA scheme. After detecting edge pixels, coding unit 60 may generate an edge mask for the block that identifies the locations of the edge pixels. For example, coding unit 60 may generate a 16 bit edge mask that identifies the locations of edge pixels in the 4×4 block (e.g., 1 bit per pixel, where 0 represents a non-edge pixel and 1 represents an edge pixel, or vice versa).

When coding color data, coding unit 60 may also determine a base color for the block. In an example in which an RGBA8888 format is used for color samples, the base color may be represented using one 32-bit value. Coding unit 60 may determine the base color for the block by combining the color samples. For example, coding unit 60 may perform an AND operation to combine samples, or determine an arithmetic average, mean, median or the like.

Coding unit 60 may then determine delta values for each pixel in the block, where the delta values represent differences between the actual sample colors and the base color. For example, coding unit 60 may determine one delta for each non-edge pixel, which is equal to the difference between the base color and the color of the samples (which is the same for non-edge pixels). In addition, coding unit 60 may determine delta values for each sample value associated with edge pixels. Accordingly, in a 4× MSAA scheme, coding unit 60 may determine four delta values for each edge pixel.

Coding unit 60 may then determine a location mask for the block that indicates the location of each sample of the block that is not equal to the base color (samples for which there is a delta that is greater than zero). Accordingly, for the 4×4 block with 4× MSAA discussed above, coding unit 60 may generate a 32-bit value that includes a bit that is set to one for each sample having a different color than the base color and a bit that is set to zero for each sample having the same color as the base color (or vice versa).

With respect to decoding, coding unit 60 may decode blocks when reading the blocks from display unit buffer 44 and/or storage unit 48. According to aspects of this disclosure, coding unit 60 may decode a coded block by scanning pixels in edge mask order. If a pixel is an edge pixel, the four next sample deltas may correspond to the current pixel (e.g., for every delta color channel). If a pixel is not an edge pixel, coding unit 60 may use one delta to replicate the color for all four samples of the pixel. Deltas may be per color channel, and the edge mask may be the same for all color channels of the pixel. Thus, for every sample, the resulting color is a combination of the base color and the delta. A delta bit count per color channel may be computed from the color mask. Each delta bit location may also be read from the color mask.

According to aspects of this disclosure, the same compression techniques described above may be applied to color and depth data, thereby providing hardware cost reductions (e.g., reductions to computational load and/or memory buss requirements). For example, in addition to coding color data, coding unit 60 may also encode/decode depth data (e.g., such as z-values). That is, coding unit 60 may code non-edge pixels by combining all of the depth samples values for a pixel. For edge pixels, coding unit 60 may determine a base depth value and may only store bits for the samples that are different than the base value, as described above with respect to the color compression example.

In some examples, RGBA channels may have different characteristics at a block level. Accordingly, adaptive memory footprints for RGBA channels may be beneficial. For example, for 4×4 block having an RGBA8888 color format and 4× MSAA, a block size may be 4×4×4×32 bits=2048 bits. In this example, a 512-bit compressed block generated according to the techniques of this disclosure is one-fourth of the original memory footprint. A fixed set of pre-determined block sizes can be used. Aspects of this disclosure may be implemented to compress a large variety of block sizes.

Aspects of this disclosure may be applied to floating point and/or integer render targets and depth buffers. As noted above, the techniques of this disclosure may generally be lossless, and may be applied in various MSAA schemes (e.g., 1×, 2×, 4×, 8×, 16×, and the like). The techniques of this disclosure may, in some examples, decrease memory consumption rates by a factor of two, and up to six or more in some applications. Conserving memory bandwidth may also reduce power consumption, due to power savings from components responsible for data transfer.

It should be understood that computing device 30 is provided as merely an example, and other computing devices 30 performing the techniques of this disclosure may be arranged differently. For example, while display buffer unit 44 is shown and described separately from storage unit 48, in other examples display unit buffer 44 and storage unit 48 may be incorporated into the same component.

Moreover, it should be understood that computing device 30 may include additional modules or units not shown in FIG. 1 for purposes of clarity. For example, computing device 30 may include a transceiver module for transmitting and receiving data, and may include circuitry to allow wireless or wired communication between computing device 30 and another device or a network. Computing device 30 may also include a speaker and a microphone, neither of which are shown in FIG. 1, to effectuate telephonic communications in examples where computing device 30 is a mobile wireless telephone, such as a smartphone, or a speaker where computing device 30 is a media player or tablet computer. In some instances, user interface unit 46 and display unit 42 may be external to computing device 30 in examples where computing device 30 is a desktop computer or other device that is equipped to interface with an external user interface or display.

FIG. 2 is a block diagram illustrating an exemplary graphics processing pipeline 80. The example pipeline 80 includes an input assembler stage 82, a vertex shader stage 84, a hull shader stage 86, a tessellator stage 88, a domain shader stage 90, a geometry shader stage 92, a rasterizer stage 94, a pixel shader stage 96, and an output merger stage 98. In some examples, an API, such as the DirectX 11 API may be configured to use each of the stages shown in FIG. 2. The graphics processing pipeline 80 is described below as being executed using GPU 36, but may be performed by a variety of other graphics processors.

Graphics processing pipeline 80 generally includes programmable stages (e.g., illustrated in FIG. 2 by blocks with rounded corners) and fixed function stages (e.g., illustrated in FIG. 2 by blocks with squared corners). For example, graphics rendering operations associated with certain stages of graphics rendering pipeline 80 are generally performed by a programmable shader processor, while other graphics rendering operations associated with other stages of graphics rendering pipeline 80 are generally preformed by non-programmable, fixed function hardware units associated with GPU 36. Graphics rendering stages performed by shading units 40 may generally be referred to as "programmable" stages, while stages performed by fixed function units may generally be referred to as fixed function stages.

Input assembler stage 82 is shown in the example of FIG. 2 as a fixed function stage and is generally responsible for supplying graphics data (triangles, lines and points) to graphics processing pipeline 80. For example, input assembler stage 82 may collect vertex data for high order surfaces, primitives, and the like, and output vertex data and attributes to vertex shader stage 84. Accordingly, input assembler stage 80 may read vertices from an off-chip memory, such as storage unit 48, using fixed function operations. Input assembler stage 80 may then create pipeline work items from these vertices, while also generating vertex identifiers ("VertexIDs"), instance identifiers ("InstanceIDs," which are made available to the vertex shader) and primitive identifiers ("PrimitiveIDs," which are available to the geometry shader and pixel shader). Input assembler stage 80 may automatically generate VertexIDs, InstanceIDs, and PrimitiveIDs upon reading the vertices.

Vertex shader stage 84 may process the received vertex data and attributes. For example, vertex shader stage 84 may perform per-vertex processing such as transformations, skinning, vertex displacement, and calculating per-vertex material attributes. In some examples, vertex shader stage 84 may generate texture coordinates, vertex color, vertex lighting, fog factors, and the like. Vertex shader stage 84 generally takes a single input vertex and outputs a single, processed output vertex.

Hull shader stage 86 receives primitives from vertex shader stage 84 and is responsible for carrying out at least two actions. First, hull shader stage 86 is typically responsible for determining a set of tessellation factors. Hull shader stage 86 may generate tessellation factors once per primitive. The tessellation factors may be used by tessellator stage 88 to determine how finely to tessellate a given primitive (e.g., split the primitive into smaller parts). Hull shader stage 86 is also responsible for generating control points that will later be used by domain shader stage 90. That is, for example, hull shader stage 86 is responsible for generating control points that will be used by domain shader stage 90 to create actual tessellated vertices, which are eventually used in rendering.

When tessellator stage 88 receives data from hull shader stage 86, tessellator stage 88 uses one of several algorithms to determine an appropriate sampling pattern for the current primitive type. For example, in general, tessellator stage 88 converts a requested amount of tessellation (as determined by hull shader stage 86) into a group of coordinate points within a current "domain." That is, depending on the tessellation factors from hull shader stage 86, as well as the particular configuration of the tessellator stage 88, tessellator stage 88 determines which points in a current primitive need to be sampled in order to tessellate the input primitive into smaller parts. The output of tessellator stage may be a set of domain points, which may include barycentric coordinates.

Domain shader stage 90 takes the domain points, in addition to control points produced by hull shader stage 86, and uses the domain points to create new vertices. Domain shader stage 90 can use the complete list of control points generated for the current primitive, textures, procedural algorithms, or anything else, to convert the barycentric "location" for each tessellated point into the output geometry that is passed on to the next stage in the pipeline.

Geometry shader stage 92 may receive a primitive defined by the vertex data (e.g., three vertices for a triangle, two vertices for a line, or a single vertex for a point) and further process the primitive. For example, geometry shader stage 82 may perform per-primitive processing such as silhouette-edge detection and shadow volume extrusion, among other possible processing operations. Accordingly, geometry shader stage 92 may receive one primitive as an input (which may include one or more vertices) and outputs zero, one, or multiple primitives (which again may include one or more vertices). The output primitive may contain more data than may be possible without geometry shader stage 92. The total amount of output data may be equal to the vertex size multiplied by the vertex count, and may be limited per invocation. The stream output from geometry shader stage 92 may allow primitives reaching this stage to be stored to the off-chip memory, such as storage unit 48 (FIG. 1). The stream output is typically tied to geometry shader stage 92, and the stream output and geometry shader stage 92 may be programmed together (e.g., using an API).

Rasterizer stage 94 is typically a fixed function stage that is responsible for clipping primitives and preparing primitives for pixel shader stage 96. For example, rasterizer stage 94 may perform clipping (including custom clip boundaries), perspective divide, viewport/scissor selection and implementation, render target selection and primitive setup. In this way, rasterizer stage 94 may generate a number of fragments for shading by pixel shader stage 96.

Pixel shader stage 96 receives fragments from rasterizer stage 94 and generates per-pixel data, such as color. Pixel shader stage 96 may also perform per-pixel processing such as texture blending and lighting model computation. Accordingly, pixel shader stage 96 may receive one pixel as an input and may output one pixel at the same relative position (or a zero value for the pixel).

Output merger stage 98 is generally responsible for combining various types of output data (such as pixel shader values, depth and stencil information) to generate a final result. For example, output merger stage 98 may perform fixed function blend, depth, and/or stencil operations for a render target (pixel position).

In some examples, according to aspects of this disclosure, GPU 36 may compress shaded pixels from stream out (e.g., following geometry shader stage 92) or output merger stage 98. For example, GPU 36 may write shaded pixels from output merger stage 98 to an on-chip memory cache, such as GPU memory 38. GPU 36 may perform the techniques of this disclosure to compress the shaded pixel data when transferring the pixel data from on-chip memory to memory external to GPU 36. In some examples, GPU 36 may perform compression on a block by block basis (e.g., 4×4 blocks, 8×8 blocks, 16×16 blocks, and the like).

Figure 3A:
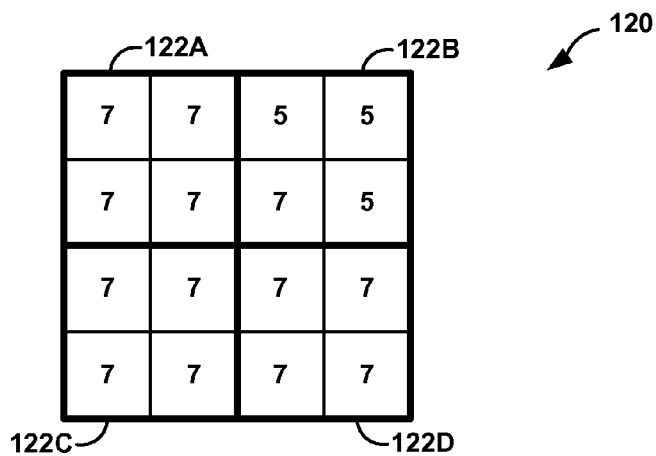
FIG. 3A is a conceptual diagram illustrating an example 2×2 block of pixels, with each pixel having four associated samples.
Figure 3B:
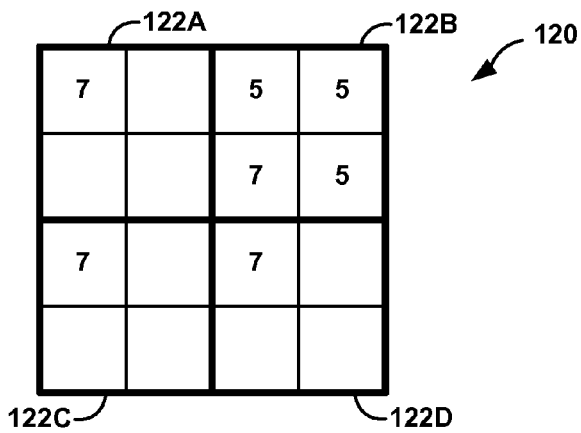
FIG. 3B is a conceptual diagram illustrating delta sample values, according to aspects of this disclosure.
Figure 3C:
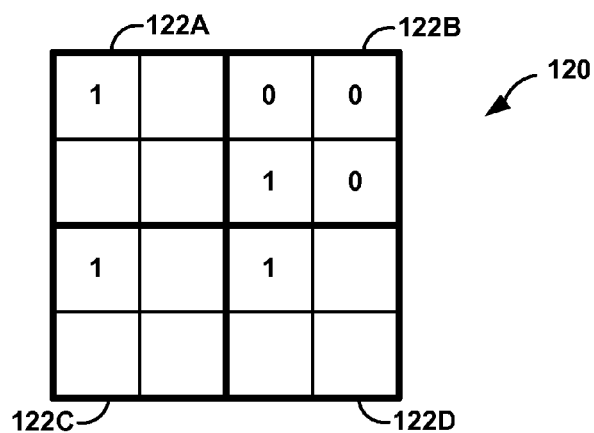
FIG. 3C is a conceptual diagram illustrating a delta location mask, according to aspects of this disclosure.

FIGS. 3A-3C are conceptual diagrams illustrating encoding an example 2×2 block of pixels 120. In the example shown in FIGS. 3A-3C each pixel 122A-122D has four associated samples (shown as boxes in pixels 122), which represents a 4× MSAA scheme. While described as being carried out by GPU 36, the techniques described with respect to FIGS. 3A-3C may be carried out by a variety of other processing units.

In the example shown in FIG. 3A, pixel 122A, 122C, and 122D are non-edge pixels with sample values of 7 (0000111) (value for purposes of illustration only). Pixel 122B, however, is an edge pixel having one sample with a value of 7 (0000111) and three samples with a value of 5 (00000101) (again, value for purposes of illustration only).

Accordingly, as shown in FIG. 3B, GPU 36 may identify pixels 122A, 122C, and 122D as non-edge pixels and may compress the sample values to a single sample value (7). Due to the differing sample values, GPU 36 may determine that pixel 122B is an edge pixel, and may not compress the sample values into a single value.

GPU 36 may generate an edge mask to indicate which pixels are edge pixels. In the example shown in FIGS. 3A-3C, the edge mask may be 0100 (e.g., in raster order, with the 1 indicating 122B as the edge pixel). As noted above with respect to FIG. 1, GPU 36 may also generate a base value. For example, GPU 36 may generate a base value using a bitwise AND operation that may be equal to (7) & (5 & 5 & 7 & 5) & (7) & (7)=5 (00000101). In other examples, GPU 36 may generate the base value using an alternative method (e.g., arithmetic average, mean, median, and the like).

In some examples, GPU 36 may indicate the delta values using a difference mask. For example, in the example shown in FIGS. 3A-3C, GPU 36 may perform a bitwise XOR operation that may be equal to (7) ^ (5^ 5 ^ 7 ^ 5) ^ (7) ^ (7)=2 (00000010). GPU 36 may also generate a location mask to indicate the location of each of the samples with which the actual sample value differs from the base value. In some examples, GPU 36 may set one location bit for each non-edge pixel (because all samples are the same) and four location bits for each edge pixel (one bit for each sample). Accordingly, in the example shown in FIGS. 3A-3C, the location mask may be equal to (1) (0 0 1 0) (1) (1), which yields 1001011 (raster order). That is, with respect to FIG. 3C, (1) relates to pixel 122A, (0 0 1 0) relates to pixel 122B, (1) relates to pixel 122C, and (1) relates to pixel 122D.

According to aspects of this disclosure, instead of storing 8 bits per pixel (bpp) for a single color (e.g., 4 samples×4 samples×8 bits of color=128b), a compressed block memory footprint may be approximately 1.7 bpp (e.g., 8 bit base color+8 bit difference mask+4 bit edge mask+7 bits of location mask (deltas=1+4*1+1+1)=27 bits per 2×2 block of pixels). Hence, 27 bits per block divided by 16 MSAA samples is equal to approximately 1.68 bpp.

With respect to the example shown above, it is assumed that the format is an RGBA8888 format and that 4× MSAA is used. According to this example, the compressed block stores 32b base color (8b per channel), 32b difference mask (8b per channel), 16b edge mask (1b per pixel), and variable size location masks per encoded sample (e.g., 0-8b per sample, with a different bit for each color channel). Thus, the compressed block memory footprint is roughly 96 bits plus delta bits. The delta memory footprint may depend on block content. While the example described above is described with respect to a specific format and aliasing scheme, it should be understood that the techniques of this disclosure may be applied to other formats and other anti-aliasing techniques.

In addition, while the example shown in FIGS. 3A-3C is described with respect to color values, the same techniques may be performed for depth values. For example, with respect to z-values, each pixel 122 may have four associated z-values. GPU 36 may perform depth compression in the same manner as color compression described above. That is, GPU 36 may generate a base depth, an edge mask (e.g., indicating which pixels are edge pixels), a difference mask (e.g., indicating differences between the base depth and actual depths), and a location mask (e.g., indicating the locations for samples having non-zero delta values).

Figure 4:
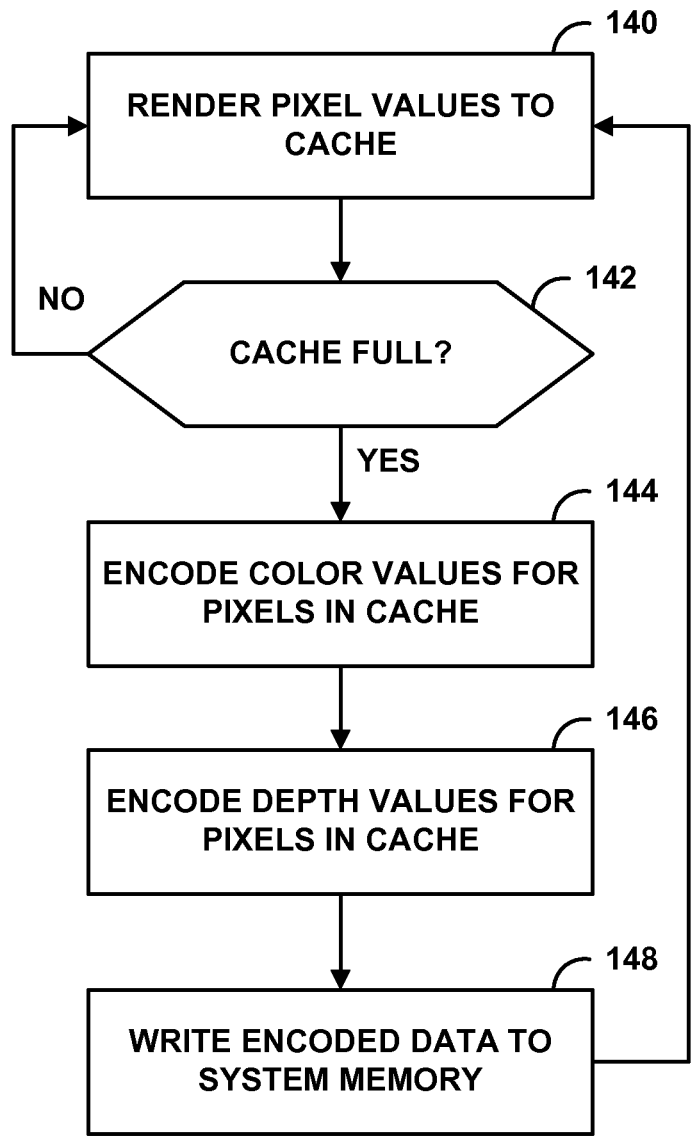
FIG. 4 is a flowchart illustrating an example process for encoding graphics data, according to aspects of this disclosure.

FIG. 4 is a flowchart illustrating an example process for encoding graphics data, according to aspects of this disclosure. While the process shown in FIG. 4 is described as being carried out by GPU 36 (FIG. 1), the techniques may be implemented by a variety of other processing units.

In the example of FIG. 4, GPU 36 renders pixels values to a cache (140). The cache may be included, for example, in GPU memory 38 such that the cache is an on-chip memory. GPU 36 may determine whether the cache is full, or that the data written to the cache is otherwise ready to be written out from on-chip memory (142).

If the cache is full (the "yes" branch of step 142), GPU 36 may encode color values for the pixels in the cache (144). For example, for non-edge pixels, GPU 36 may compress the sample values to generate a single value for all samples. For edge pixels, GPU 36 may not compress the sample values. In any case, GPU 36 may determine a base value for the samples, and determine the differences between the base value and the actual sample values.

In addition, GPU 36 may encode depth values for the pixels in the cache (146). For example, as described above, GPU 36 may encode depth values in the same way as color values. That is, for non-edge pixels, GPU 36 may compress the sample values to generate a single value for all samples. For edge pixels, GPU 36 may not compress the sample values. In any case, GPU 36 may determine a base depth value for the samples, and determine the differences between the base depth value and the actual sample values.

After coding the color and depth values, GPU 36 may write the encoded graphics data from the cache to system memory (148). For example, GPU 36 may write the encoded graphics data from the cache to display unit buffer 44 and/or storage unit 48. It should be understood that the steps shown in FIG. 4 are provided as merely one example. That is, the steps shown in FIG. 4 need not necessarily be performed in the order shown, and fewer, additional, or alternative steps may be performed.

Figure 5:
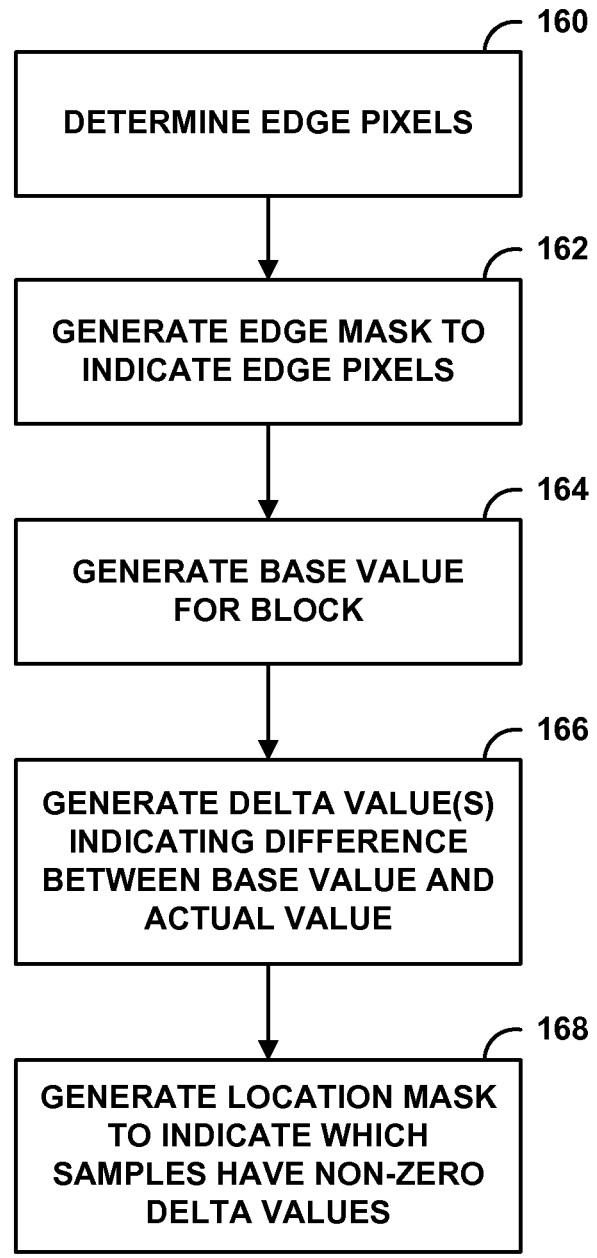
FIG. 5 is a flowchart illustrating an example process for encoding color and/or depth values, according to aspects of this disclosure.

FIG. 5 is a flowchart illustrating an example process for encoding color and/or depth values, according to aspects of this disclosure. While the process shown in FIG. 5 is described as being carried out by GPU 36 (FIG. 1), the techniques may be implemented by a variety of other processing units. In some examples, the process shown in the example of FIG. 5 may be carried out when performing steps 144 and/or 146 of FIG. 4.

In the example shown in FIG. 5, GPU 36 may determine whether pixels are edge pixels (160). For example, with respect to encoding color, GPU 36 may determine whether pixels are edge pixels by identifying differing color samples for a pixel. With respect to depth, GPU 36 may determine whether pixels are edge pixels by identifying differing depth samples for a pixel. In any case, for 4× MSAA, if all four sample values of a pixel are equal, GPU 36 may identify the pixel as a non-edge pixel. Alternatively, if one or more of the sample values of a pixel are different, GPU 36 may identify the pixel as an edge pixel.

GPU 36 may generate an edge mask to indicate the locations of edge pixels in a block of pixels (162). For example, GPU 36 may generate a bit string that indicates the position of each edge pixel in a block of pixels. GPU 36 may also generate a base value for the block (164). That is, when encoding color, GPU 36 may generate the base color for the block. When encoding depth information, GPU 36 may generate a base depth value.

After generating the base value, GPU 36 may generate delta values that indicate a difference between the base value and the actual value for each of the samples in the block (166). In some examples, GPU 36 may generate a single delta value for non-edge pixels, which represents the difference between the base value and a combined sample value (because all samples are equal in value). GPU 36 may generate delta values for each sample of edge pixels, which also represent the difference between the base value and the sample values.

GPU 36 may also generate a location mask to indicate which sample values are associated with the generated deltas (168). For example, GPU 36 may generate a bit string indicating the location of each sample value that differs from the base value. In some examples, non-edge pixels can be represented with a single value, regardless of the number of samples associated with the pixel, as described above.

It should be understood that the steps shown in FIG. 5 are provided as merely one example. That is, the steps shown in FIG. 5 need not necessarily be performed in the order shown, and fewer, additional, or alternative steps may be performed.

Figure 6:
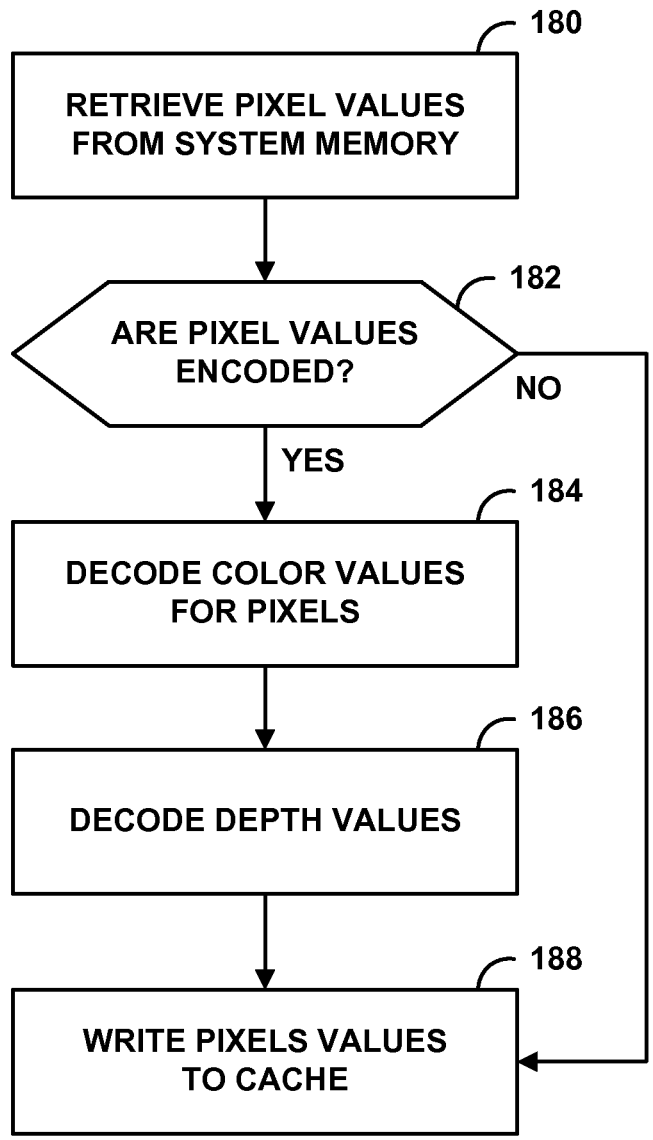
FIG. 6 is a flowchart illustrating an example process for decoding graphics data, according to aspects of this disclosure.

FIG. 6 is a flowchart illustrating an example process for decoding graphics data, according to aspects of this disclosure. While the process shown in FIG. 6 is described as being carried out by GPU 36 (FIG. 1), the techniques may be implemented by a variety of other processing units.

GPU 36 may retrieve pixel values from system memory (180). For example, GPU 36 may read pixel values from display unit buffer 44 and/or storage unit 48. GPU 36 may also determine whether the pixel values being read are encoded values (182). That is, in some examples, GPU 36 may be preconfigured to perform encoding and decoding of graphics data any time such data is transferred between local GPU memory (such as GPU memory 38) and system memory (such as display unit buffer 44 and/or storage unit 48). In such examples, the determining step 182 may not be carried out. In other examples, however, GPU 36 may be configurable, and may not always perform encoding/decoding functions (e.g., depending on system resources). In such examples, GPU 36 may determine whether data being read from system memory has been previously encoded.

In any case, if the pixel values are encoded (the "yes" branch of step 182), GPU 36 may decode the color values for the pixels (184). For example, GPU 36 may determine a base value, determine which samples are different than the base value, and combine received delta values with the base value to generate the decoded pixel values. As noted above, the base value, edge mask (indicating samples that are different than the base value) and delta mask may be provided with the coded data. GPU 36 may also decode depth values for the pixels in the same way (186). After decoding the color and/or depth values, GPU 36 may write the pixel values to a cache, such as GPU memory 38 (188).

It should be understood that the steps shown in FIG. 6 are provided as merely one example. That is, the steps shown in FIG. 6 need not necessarily be performed in the order shown, and fewer, additional, or alternative steps may be performed. For example, while FIG. 6 illustrates decoding both color and depth values, in some examples, only color or depth values may be decoded.

Figure 7:
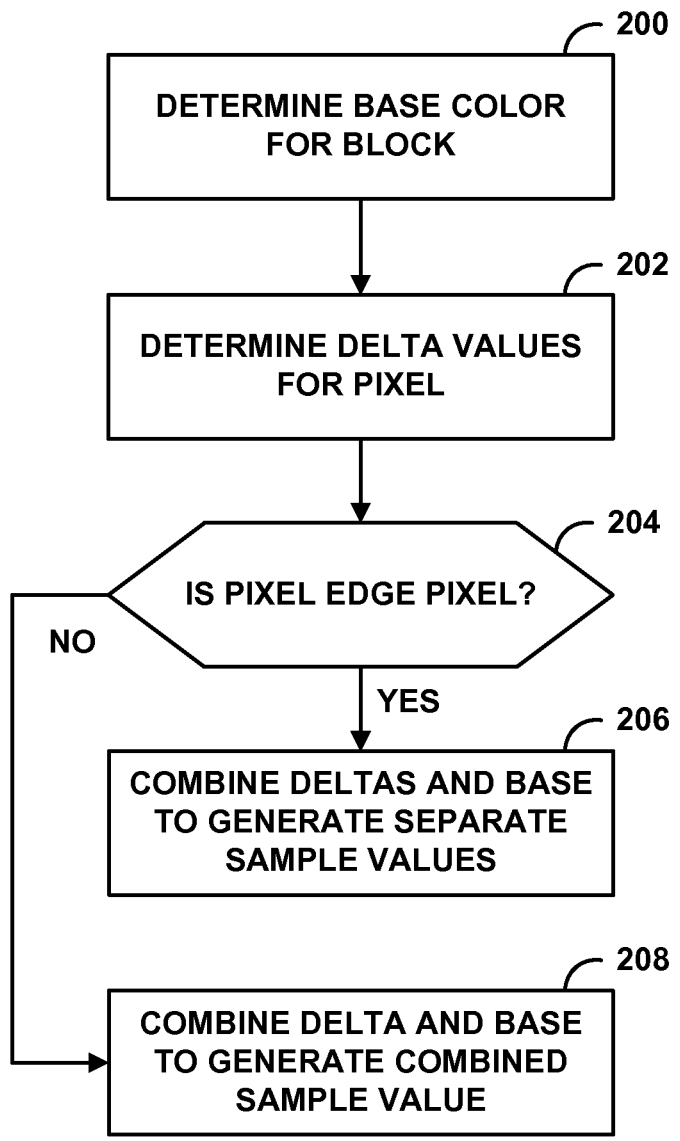
FIG. 7 is a flowchart illustrating an example process for decoding color and/or depth values, according to aspects of this disclosure.

FIG. 7 is a flowchart illustrating an example process for decoding color and/or depth values, according to aspects of this disclosure. While the process shown in FIG. 7 is described as being carried out by GPU 36 (FIG. 1), the techniques may be implemented by a variety of other processing units. In some examples, the process shown in FIG. 7 may be carried out when performing steps 184 and/or 186 of FIG. 6.

In the example of FIG. 7, GPU 36 may determine a base value for a block of pixels (200). In some examples, GPU 36 may receive an indication of the base value. For example, as noted above with respect to FIG. 5, GPU 36 may determine the base value at the time of encoding. Accordingly, the base value may be included with the retrieved data. GPU 36 may also determine delta values for pixels of the block (202). In the same way as the base value, the delta values for the block may be included with retrieved data.

The manner in which the received base value and received delta values are combined may depend on whether pixels are edge pixels or non-edge pixels. Accordingly, GPU 36 may determine whether a pixel is an edge pixel or non-edge pixel, for example, using a received edge mask (204).

GPU 36 may scan pixels in edge mask order. For edge pixels (the "yes" branch of step 204), GPU 36 may combine the next four (for 4× MSAA) delta values with the base value to generate the actual separate sample values (e.g., 4 actual sample values) for the pixel (206). If a pixel is not an edge pixel (the "no" branch of step 204), GPU may combine the next single delta value with the base value to generate a combined sample value for the pixel (208).

The steps described with respect to FIG. 7 may be performed for decoding color and/or depth values. It should be understood that the steps shown in FIG. 7 are provided as merely one example. That is, the steps shown in FIG. 7 need not necessarily be performed in the order shown, and fewer, additional, or alternative steps may be performed.

It should also be understood that, depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of encoding graphics data comprising a plurality of pixels, the method comprising:

determining, by a graphics processing unit (GPU), a plurality of sample values for each pixel of the plurality of pixels;

determining whether each pixel comprises an edge pixel, wherein the determination is based on identification of, for each pixel, differing sample values of the plurality of sample values for the respective pixel;

based on determining that a pixel of the plurality of pixels is an edge pixel, encoding the edge pixel, wherein encoding the edge pixel comprises:
generating a base value for a block of pixels that includes the edge pixel; and
generating delta values between each sample value of the edge pixel and the base value for the block of pixels; and based on determining that a second pixel of the plurality of pixels is not an edge pixel, generating a single delta value between a sample value of the second pixel and the base value.

2. The method of claim 1, further comprising storing the encoded pixel data to a buffer external to the GPU.

3. The method of claim 2, further comprising storing the encoded pixel data to a block cache, and wherein storing the encoded pixel data comprises writing out contents of the block cache to the buffer.

4. The method of claim 1, wherein determining the plurality of sample values comprises performing multi-sample anti-aliasing to generate the plurality of sample values for each pixel of the plurality of pixels.

5. The method of claim 1, wherein the plurality of sample values comprise color values and wherein determining whether pixels comprise edge pixels comprises identifying, for each pixel, whether the sample values for the pixel include different color values.

6. The method of claim 5, wherein encoding the pixels further comprises:
generating an edge mask that identifies edge pixels comprising the edge pixel in the block of pixels;
wherein generating the base value comprises generating a base color value for the block of pixels; and
wherein generating the delta values comprises generating delta color values between color sample values of each edge pixel identified by the edge mask of the block of pixels and the base color value for the block of pixels.

7. The method of claim 1, wherein the plurality of sample values comprise depth values and wherein determining whether pixels comprise edge pixels comprises identifying, for each pixel, whether the sample values for the pixel include different depth values.

8. The method of claim 7, wherein encoding the pixels further comprises:
generating an edge mask that identifies edge pixels comprising the edge pixel in the block of pixels;
wherein generating the base value comprises generating a base depth value for the block of pixels; and
wherein generating the delta values comprises generating delta depth values between depth sample values of each edge pixel identified by the edge mask of the block of pixels and the base depth value for the block of pixels.

9. The method of claim 1, wherein generating the base value for the block of pixels that includes the edge pixel comprises combining sample values of the pixels of the block.

10. An apparatus for encoding graphics data comprising a plurality of pixels, the apparatus comprising:

a memory configured to store the plurality of pixels; and
one or more processors configured to:
- determine a plurality of sample values for each pixel of the plurality of pixels;
- determine whether each pixel comprises an edge pixel, wherein the determination is based on identification of, for each pixel, differing sample values of the plurality of sample values for the respective pixel;
- based on determining that a pixel of the plurality of pixels is an edge pixel, encode the edge pixel, wherein to encode the edge pixel, the one or more processors are configured to:
  - generate a base value a block of pixels that includes the edge pixel; and
  - generate delta values between each sample value of the edge pixel and the base value for the block of pixels; and
- based on determining that a second pixel of the plurality of pixels is not an edge pixel, generate a single delta value between a sample value of the second pixel and the base value.

11. The apparatus of claim 10, wherein the one or more processors are further configured to store the encoded pixel data to a buffer external to the GPU.

12. The apparatus of claim 11, wherein the one or more processors are further configured to store the encoded pixel data to a block cache, and wherein storing the encoded pixel data comprises writing out contents of the block cache to the buffer.

13. The apparatus of claim 10, wherein to determine the plurality of sample values, the one or more processors are configured to perform multi-sample anti-aliasing to generate the plurality of sample values for each pixel of the plurality of pixels.

14. The apparatus of claim 10, wherein the plurality of sample values comprise color values and wherein to determine whether pixels comprise edge pixels, the one or more processors are configured to identify, for each pixel, whether the sample values for the pixel include different color values.

15. The apparatus of claim 14, wherein to encode the pixels, the one or more processors are configured to:
- generate an edge mask that identifies edge pixels comprising the edge pixel in the block of pixels;
- wherein to generate the base value, the one or more processors are configured to generate a base color value for the block of pixels; and
- wherein to generate the delta values, the one or more processors are configured to generate delta color values between color sample values of each edge pixel identified by the edge mask of the block of pixels and the base color for the block of pixels.

16. The apparatus of claim 10, wherein the plurality of sample values comprise depth values and wherein to determine whether pixels comprise edge pixels, the one or more processors are configured to identify, for each pixel, whether the sample values for the pixel include different depth values.

17. The apparatus of claim 16, wherein to encode the pixels, the one or more processors are configured to:
- generate an edge mask that identifies edge pixels comprising the edge pixel in the block of pixels;
- wherein to generate the base value, the one or more processors are configured to generate a base depth value for the block of pixels; and
- wherein to generate the delta values, the one or more processors are configured to generate delta depth values between depth sample values of each edge pixel identified by the edge mask of the block of pixels and the base depth value for the block of pixels.

18. An apparatus for encoding graphics data comprising a plurality of pixels, the apparatus comprising:
- means for determining a plurality of sample values for each pixel of the plurality of pixels;
- means for determining whether each pixel comprises an edge pixel, wherein the determination is based on identification of, for each pixel, differing sample values of the plurality of sample values for the respective pixel;
- means for, based on determining that a pixel of the plurality of pixels is an edge pixel, encoding the edge pixel, wherein the means for encoding the edge pixel comprises:
  - means for generating a base value for the block of pixels that includes the edge pixel; and
  - means for generating delta values between each sample value of the edge pixel and the base value for the block of pixels; and
- means for, based on determining that a second pixel of the plurality of pixels is not an edge pixel, generating a single delta value between a sample value of the second pixel and the base value.

19. The apparatus of claim 18, further comprising means for storing the encoded pixel data to a buffer external to the GPU.

20. The apparatus of claim 19, further comprising means for storing the encoded pixel data to a block cache, and wherein the means for storing the encoded pixel data comprises means for writing out contents of the block cache to the buffer.

21. The apparatus of claim 18, wherein the means for determining the plurality of sample values comprises means for performing multi-sample anti-aliasing to generate the plurality of sample values for each pixel of the plurality of pixels.

22. The apparatus of claim 18, wherein the plurality of sample values comprise color values and wherein the means for determining whether pixels comprise edge pixels comprises means for identifying, for each pixel, whether the sample values for the pixel include different color values.

23. The apparatus of claim 22, wherein the means for encoding the pixels further comprises:
- means for generating an edge mask that identifies edge pixels comprising the edge pixel in the block of pixels;
- wherein the means for generating the base value comprises means for generating a base color value for the block of pixels; and
- wherein the means for generating the delta values comprises means for generating delta color values between color sample values of each edge pixel identified by the edge mask of the block of pixels and the base color for the block of pixels.

24. The apparatus of claim 18, wherein the plurality of sample values comprise depth values and wherein the means for determining whether pixels comprise edge pixels comprises means for identifying, for each pixel, whether the sample values for the pixel include different depth values.

25. The apparatus of claim 24, wherein the means for encoding the pixels further comprises:
- means for generating an edge mask that identifies edge pixels comprising the edge pixel in the block of pixels;
- wherein the means for generating the base value comprises means for generating a base depth value for the block of pixels; and
- wherein the means for generating the delta values comprises means for generating delta depth values between depth sample values of each edge pixel identified by the edge mask of the block of pixels and the base depth value for the block of pixels.

26. A non-transitory computer-readable medium having instructions stored thereon that, when executed, cause one or more processors to:
- determine a plurality of sample values for each pixel of the plurality of pixels;
- determine whether each pixel comprises an edge pixel, wherein the determination is based on identification of, for each pixel, differing sample values of the plurality of sample values for the respective pixel;
- based on determining that a pixel of the plurality of pixels is an edge pixel, encode the pixel as an edge pixel, wherein to encode the edge pixel, the instructions cause the one or more processors to:
  - generate a base value for the block of pixels that includes the edge pixel; and
  - generate delta values between each sample value of the edge pixel and the base value for the block of pixels; and
- based on determining that a second pixel of the plurality of pixels is not an edge pixel, generate a single delta value between a sample value of the second pixel and the base value.

27. The non-transitory computer-readable medium of claim 26, wherein the instructions cause the one or more processors to store the encoded pixel data to a buffer external to the GPU.

28. The non-transitory computer-readable medium of claim 27, wherein the instructions cause the one or more processors to store the encoded pixel data to a block cache, and wherein storing the encoded pixel data comprises writing out contents of the block cache to the buffer.

29. The non-transitory computer-readable medium of claim 26, wherein to determine the plurality of sample values, the instructions cause the one or more processors to perform multi-sample anti-aliasing to generate the plurality of sample values for each pixel of the plurality of pixels.

30. The non-transitory computer-readable medium of claim 26, wherein the plurality of sample values comprise color values and wherein to determine whether pixels comprise edge pixels, the instructions cause the one or more processors to identify, for each pixel, whether the sample values for the pixel include different color values.

31. The non-transitory computer-readable medium of claim 30, wherein to encode the pixels, the instructions cause the one or more processors to:
- generate an edge mask that identifies edge pixels comprising the edge pixel in the block of pixels;
- wherein to generate the base value, the instructions cause the one or more processors to generate a base color value for the block of pixels; and
- wherein to generate the delta values, the instructions cause the one or more processors to generate delta color values between color sample values of each edge pixel identified by the edge mask of the block of pixels and the base color for the block of pixels.

32. The non-transitory computer-readable medium of claim 26, wherein the plurality of sample values comprise depth values and wherein to determine whether pixels comprise edge pixels, the instructions cause the one or more processors to identify, for each pixel, whether the sample values for the pixel include different depth values.

33. The non-transitory computer-readable medium of claim 32, wherein to encode the pixels, the instructions cause the one or more processors to:
- generate an edge mask that identifies edge pixels comprising the edge pixel in the block of pixels;
- wherein to generate the base value, the instructions cause the one or more processors to generate a base depth value for the block of pixels; and
- wherein to generate the delta values, the instructions cause the one or more processors to generate delta depth values between depth sample values of each edge pixel identified by the edge mask of the block of pixels and the base depth value for the block of pixels.

* * * * *